United States Patent
Gattupalli et al.

(10) Patent No.: US 8,912,111 B2
(45) Date of Patent: Dec. 16, 2014

(54) PROCESS FOR CATALYST RECOVERY AND OPTIONAL RECYCLE IN A SLURRY HYDROCRACKING PROCESS

(75) Inventors: Rajeswar R. Gattupalli, Arlington Heights, IL (US); Grant H. Yokomizo, Mt. Prospect, IL (US); Bart Dziabala, Hickory Hills, IL (US)

(73) Assignee: UOP LLC, Des Plaines, IL (US)

( * ) Notice: Subject to any disclaimer, the term of this patent is extended or adjusted under 35 U.S.C. 154(b) by 359 days.

(21) Appl. No.: 13/568,473

(22) Filed: Aug. 7, 2012

(65) Prior Publication Data

US 2014/0045679 A1    Feb. 13, 2014

(51) Int. Cl.
| | |
|---|---|
| B01J 31/00 | (2006.01) |
| B01J 21/18 | (2006.01) |
| B01J 21/02 | (2006.01) |
| B01J 27/02 | (2006.01) |
| C01G 23/02 | (2006.01) |
| C01G 1/00 | (2006.01) |
| C01G 3/12 | (2006.01) |

(52) U.S. Cl.
USPC .......... 502/103; 502/185; 502/207; 502/216; 423/37; 423/48; 423/83; 423/138

(58) Field of Classification Search
None
See application file for complete search history.

(56) References Cited

U.S. PATENT DOCUMENTS

| 4,818,373 A | 4/1989 | Bartholic et al. |
| 2010/0167910 A1 | 7/2010 | Odueyungbo |

FOREIGN PATENT DOCUMENTS

| EP | 34908 A | 4/1984 |
| EP | 614699 B1 | 6/1997 |

OTHER PUBLICATIONS

Barik et al. "Direct leaching of molybdenum and cobalt from spent hydrodesulphurizafion catalyst with sulphuric acid," Hydromentallurgy, v. 111-112, n 1, p. 46-51, Jan. 2012.
Zeng et al. "A literature review fo the recovery of molybdenum . . .", Hydrometallurgy, v. 9, n 1-2, p. 1-9, Aug. 2009.
Wahoud et al. "Sulfuric acid baking and leaching . . . ", Periodical Polytechnica; Chemical Engineering, v 55, 1 1, p. 31-34, 2011.

*Primary Examiner* — Melvin C Mayes
*Assistant Examiner* — Sheng H Davis
(74) *Attorney, Agent, or Firm* — James C. Paschall

(57) ABSTRACT

A process for slurry hydrocracking catalyst recovery is described. In one embodiment, the process includes separating effluent from a slurry hydrocracking zone into a first portion comprising solvent and clarified pitch and a second portion comprising pitch and catalyst. The second portion is contacted with an acid to leach the catalyst out of the pitch forming an aqueous solution and pitch residue. The aqueous solution is contacted with an anion to form an insoluble salt which is the catalyst.

7 Claims, 2 Drawing Sheets

PROCESS FOR CATALYST RECOVERY AND OPTIONAL RECYCLE IN A SLURRY HYDROCRACKING PROCESS

FIELD OF THE INVENTION

This invention relates generally to slurry hydrocracking processes, and more particularly to a process for catalyst recovery and optional catalyst recycle.

BACKGROUND OF THE INVENTION

Slurry hydrocracking processes involve the processing of a mixture of residue and fine particulate catalyst in an upflow reactor in a hydrogen-rich environment. This reaction environment facilitates very high conversion of residue to liquid products, particularly distillate boiling-range components. One example of a slurry hydrocracking process is shown in FIG. 1. Liquid feed 5 and recycle gas 10 are heated to temperature in separate heaters 15, 20 with a small portion of the recycle gas stream and the required amount of catalyst being routed through the oil heater. The outlet streams 25, 30 from both heaters 15, 20 are fed to the bottom of the slurry reactor zone 35. The reactor effluent 40 is quenched at the reactor outlet to terminate reactions and then flows to a series of separators 45, 50, 55, 60 with gas 10 being recycled back to the reactor. Liquids flow to the unit's fractionation section 65, 70 for recovery of light ends 75, naphtha 80, diesel 85, light and heavy vacuum gas oils 90, 95, and unconverted feed (pitch) 100. Heavy vacuum gas oil 105 is partially recycled to the reactor for further conversion.

Catalyst is lost during the process, and fresh catalyst makeup is required. In some processes, the fresh catalyst makeup can be up to 1 wt % or more. In addition, the processes can produce about 2-20 wt % pitch. The amount of catalyst in the pitch, and the small size of the catalyst particles, e.g., less than 1 μm, make it difficult to recover the catalyst particles using simple separation techniques.

There is a need for a process for recovering catalyst used in a slurry hydrocracking process.

SUMMARY OF THE INVENTION

One aspect of the present invention relates to a process for slurry hydrocracking catalyst recovery. In one embodiment, the process includes separating effluent from a slurry hydrocracking zone into a first portion comprising solvent and clarified pitch and a second portion comprising pitch and catalyst. The second portion is contacted with an acid to leach the catalyst out of the pitch forming an aqueous solution and pitch residue. The aqueous solution is contacted with an anion to form an insoluble salt and a second aqueous solution, the insoluble salt being the catalyst.

DETAILED DESCRIPTION OF THE INVENTION

The catalyst recovery and optional recycle process involves an acid leaching process to recover the catalyst. The recovered catalyst is desirably recycled back to the slurry hydrocracking reactor, reducing the amount of makeup catalyst needed.

The catalyst recovery and optional recycle process may have one or more of the following benefits. In some embodiments, there can be lower capital costs because there is a smaller fresh catalyst preparation and materials handling system. In some embodiments, the operating costs may be lower because the amount of fresh catalyst makeup is lower. In some embodiments, the process may result in a higher value product because the pitch has a lower sulfur and ash content. For example, the pitch might be able to be used in marine fuel oil or as a modifier for asphalt.

Figure 1:
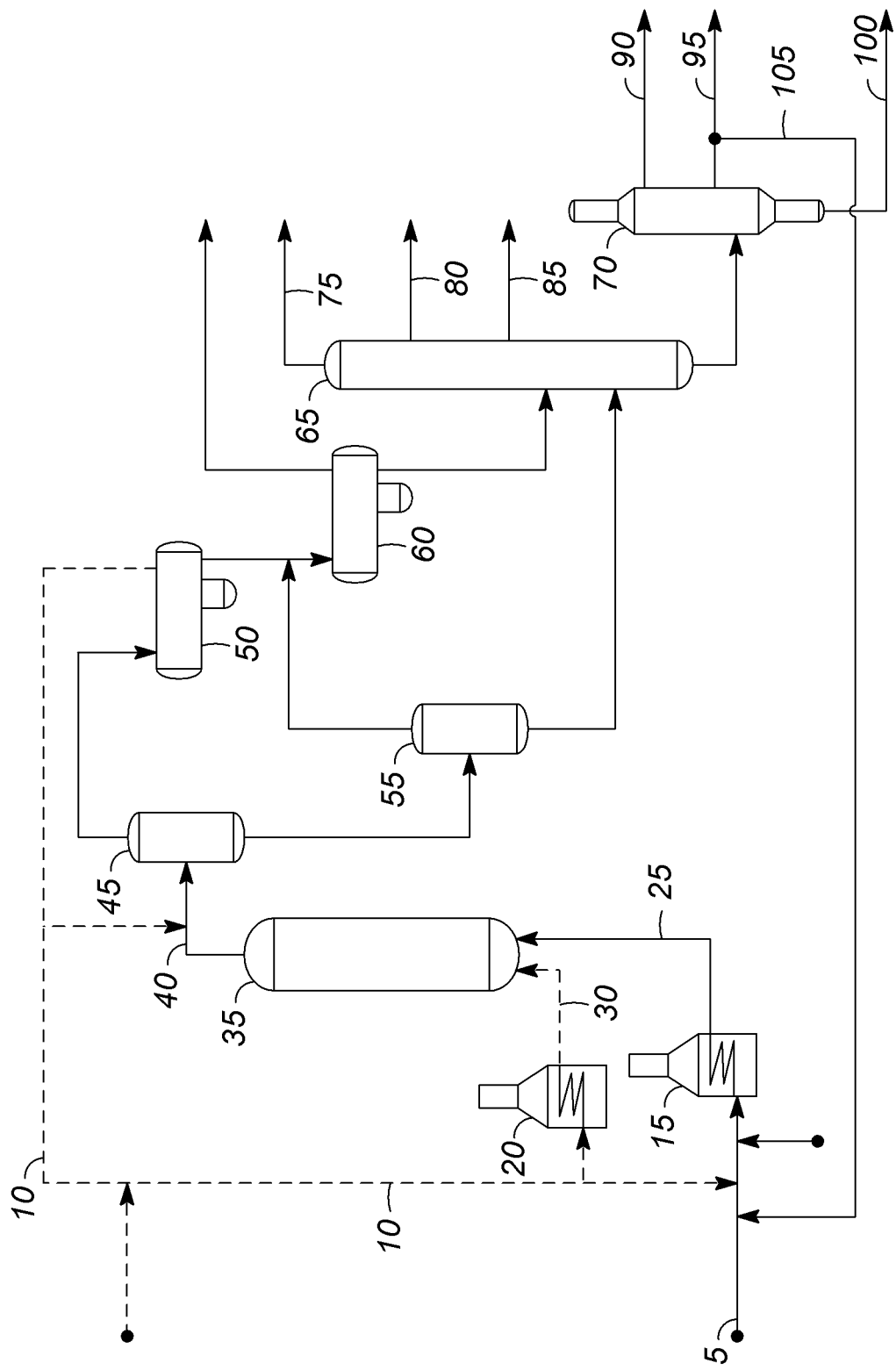
FIG. 1 illustrates one embodiment of a slurry hydrocracking process.
Figure 2:
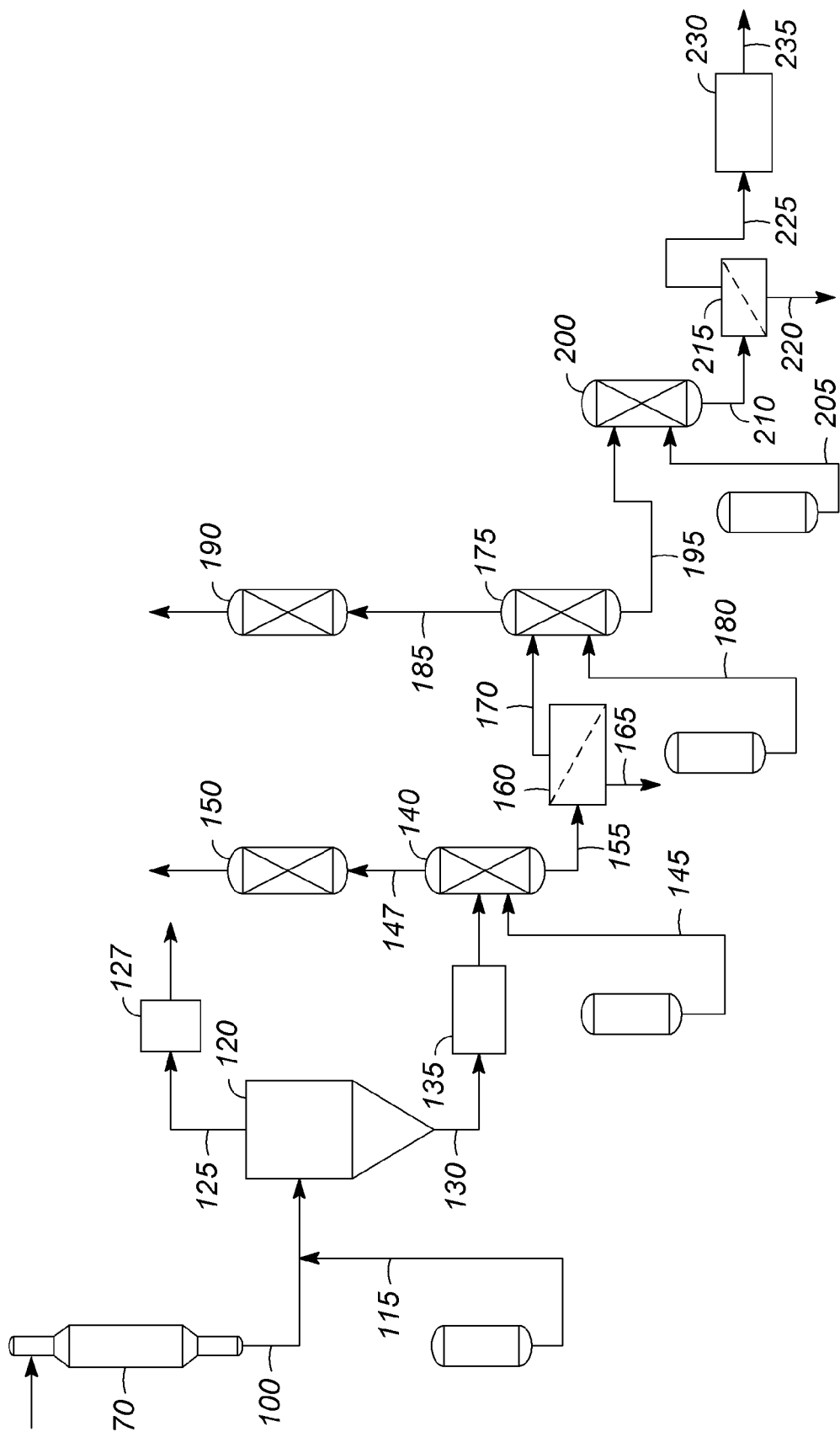
FIG. 2 illustrates one embodiment of a catalyst recovery and recycle process.

In one embodiment of the catalyst recovery and recycle process as illustrated in FIG. 2, a bottoms stream 100 from the fractionator 70 contains pitch and HVGO. An optional low viscosity aromatic solvent 115 may be combined with the bottoms stream 100. Suitable solvents include, but are not limited to Light Cycle Oil (LCO) and Clarified Slurry Oil (CSO). The combined bottoms stream 100/solvent stream 115 is sent to separator 120, where it is separated into a first portion 125 containing solvent and clarified pitch, and a second portion 130 containing pitch and catalyst. Suitable separation methods include, but are not limited to, centrifuging, filtering, settling, or electrostatic precipitating. The first portion 125 can be further processed, for example, in a fractionation unit 127, if desired.

The second portion 130 can be sent to an optional grinder 135 to reduce the particle size of the material, if desired. The second portion 130 containing the pitch and catalyst (whether ground or not), is sent to a tank 140 where it is contacted with an acid 145 to leach the catalyst out of the pitch. The acid leaching forms a mixture of an aqueous solution and pitch residue 155, and, in some cases, gas 147. The gas 147 can be sent to a scrubber 150. Any suitable acid can be used, including, but not limited to, $H_2SO_4$, HCl, and $HNO_3$.

The mixture of the aqueous solution and pitch residue 155 from the acid leaching tank 140 is sent to a separator 160 where the pitch residue 165 is separated from the aqueous solution 170. In some embodiments, the aqueous solution 170 is sent to neutralization tank 175, where it is neutralized with a neutralization agent 180. Any suitable neutralization agent can be used, including, but not limited to, NaOH, and $CaCO_3$. Any gas 185 formed in the neutralization tank 175 is sent to a scrubber 190.

The neutralized solution 195 is sent to precipitation tank 200 and contacted with an anion 205, causing the precipitation of an insoluble salt. The anion 205 is selected based on the catalyst being recovered. Any anion that will form an insoluble salt can be used, including, but not limited to sulfides, oxides, hydroxides, carbonates, and phosphates. The precipitation mixture 210 is sent to a separator 215, where the second aqueous solution 220 is separated from precipitated insoluble salt 225, which is the catalyst. The precipitated insoluble salt 225 can be sent to a catalyst preparation unit 230. The catalyst preparation step only involves physical processing with no changes in the chemical nature of the catalyst, and it can include, but is not limited to, one or more of washing, drying, and grinding.

The recovered catalyst 235 can then be recycled back to the slurry hydrocracking zone, reducing the need for makeup catalyst.

In one embodiment, the slurry hydrocracking catalyst is $Fe_{(1-x)}S$, where x is between 0 and 0.2. The $Fe_{(1-x)}S$ catalyst is contacted with a suitable acid, such as $H_2SO_4$, forming an aqueous solution of $FeSO_4$. The $H_2S$ gas formed can be sent to a scrubber. The pitch residue can be separated from the aqueous solution of FeSO$_4$ before neutralizing the FeSO$_4$ with a neutralizing agent, such as NaOH, if desired. The neutralized FeSO$_4$ is contacted with a sulfide anion, for example from Na$_2$S, to precipitate Fe$_{(1-x)}$S. The Fe$_{(1-x)}$S can be recovered and recycled back to the slurry hydrocracking zone.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It is understood that various changes may be made in the function and arrangement of elements described in an exemplary embodiment without departing from the scope of the invention as set forth in the appended claims.

What is claimed is:

1. A process for catalyst recovery wherein the catalyst comprises Fe$_{(1-x)}$S, where x is between 0 and 0.2, the process comprising:

separating effluent from a slurry hydrocracking zone into a first portion comprising solvent and clarified pitch and a second portion comprising pitch and Fe$_{(1-x)}$S catalyst;

contacting the second portion with H$_2$SO$_4$ to leach the Fe$_{(1-x)}$S catalyst out of the pitch forming an aqueous solution of FeSO$_4$ and pitch residue; and contacting the aqueous solution of FeSO$_4$ with Na$_2$S to form insoluble Fe$_{(1-x)}$S and an aqueous solution of Na$_2$SO$_4$.

2. The process of claim 1 further comprising recycling the insoluble Fe$_{(1-x)}$S to the slurry hydrocracking zone.

3. The process of claim 1 further comprising separating the first portion into the solvent and the clarified pitch.

4. The process of claim 1 further comprising grinding the second portion before contacting the second portion with the H$_2$SO$_4$.

5. The process of claim 1 further comprising neutralizing the aqueous solution of FeSO$_4$ with NaOH before contacting the aqueous solution of FeSO$_4$ with Na$_2$S.

6. The process of claim 5 further comprising separating the aqueous solution of FeSO$_4$ from the pitch residue before neutralizing the aqueous solution of FeSO$_4$.

7. The process of claim 1 further comprising separating the insoluble Fe$_{(1-x)}$S from the aqueous solution of Na$_2$SO$_4$.

* * * * *